United States Patent [19]

Daws

[11] Patent Number: 5,658,599
[45] Date of Patent: Aug. 19, 1997

[54] APPARATUS FOR PRODUCING FRCMC/CERAMIC FOAM PANELS

[75] Inventor: David Eric Daws, Westminster, Calif.

[73] Assignee: Northrop Grumman Corporation, Los Angeles, Calif.

[21] Appl. No.: 711,919

[22] Filed: Sep. 10, 1996

Related U.S. Application Data

[62] Division of Ser. No. 515,731, Aug. 16, 1995, Pat. No. 5,582,784.

[51] Int. Cl.⁶ ........................................ A23G 1/22
[52] U.S. Cl. .................... 425/123; 425/129.1; 264/44; 264/46.5
[58] Field of Search ................................. 425/123, 129.1; 264/44, 46.5

[56] References Cited

U.S. PATENT DOCUMENTS

| | | | |
|---|---|---|---|
| 3,846,054 | 11/1974 | Davis | 425/110 |
| 4,012,186 | 3/1977 | Ramazzotti et al. | 425/123 |
| 4,676,938 | 6/1987 | Karklin et al. | 264/46.5 |

*Primary Examiner*—Christopher Raimund
*Attorney, Agent, or Firm*—Terry J. Anderson; Karl J. Hoch, Jr.

[57] ABSTRACT

An apparatus for forming ceramic composite panels is disclosed. The ceramic composite panel comprises a pair of skins disposed in spaced relationship to one another. The pair of skins comprises fibers of a generic fiber system disposed throughout a pre-ceramic resin in its ceramic state. A ceramic foam is disposed between the pair of skins.

4 Claims, 2 Drawing Sheets

APPARATUS FOR PRODUCING FRCMC/CERAMIC FOAM PANELS

This is a division of application Ser. No. 08/515,731, filed Aug. 16, 1995, now U.S. Pat. No. 5,582,784.

BACKGROUND OF THE INVENTION

1. Technical Field

This invention relates to panels for building, aircraft construction, and the like, having a lightweight core between two outer skins and, more particularly, to a ceramic composite panel comprising a pair of skins disposed in spaced relationship to one another, the pair of skins comprising fibers of a generic fiber system disposed throughout a pre-ceramic resin in its ceramic state; and, ceramic foam disposed between the pair of skins.

2. Background Art

Various panels having a lightweight core between two outer skins are well known in the art. For example, so-called "hollow-core" doors are used for interior doors of houses because they are lightweight, relatively strong, resistant to warping, and inexpensive to make. Moreover, they use less valuable raw materials and substitute less costly materials. Cardboard tubing or lightweight lattice structures form the "core" of the door and are covered by thin pieces of plywood which form the outer surfaces of the door.

Such composite panels are being used in other applications as well for like reasons. For example, posters and other art are often mounted on panels comprising two sheets of lightweight cardboard adhesively attached to a core of lightweight plastic foam.

Aircraft have been a leading consumer of composite panel structures. This is because light weight combined with strength is a primary design criteria for aircraft materials. The more an aircraft weighs in and of itself, the less payload it can lift and carry. Thus, we find aircraft panels being made of titanium skins pressure welded to a titanium honeycomb core.

Where heat is a problem, panel design under the prior art is severely limited. Metals can deform and even melt under high temperatures. The Space Shuttle, for example, requires non-metallic materials to perform its intended mission. The nose of each Shuttle must be covered with special ceramic tiles in order to withstand the heat of re-entry through the atmosphere. What would be desirable is a panel of ceramic which can withstand such temperatures in and of itself while, at the same time, being strong and light-weight.

Wherefore, it is an object of the present invention to provide a composite ceramic panel structure and method of making it which is tolerant to high temperatures such as would be encountered by re-entry of space vehicles into the Earth's atmosphere.

It is another object of the present invention to provide apparatus for producing composite ceramic panel structures.

Other objects and benefits of this invention will become apparent from the description which follows hereinafter when read in conjunction with the drawing figures which accompany it.

SUMMARY OF THE DISCLOSURE

The foregoing objects have been achieved by one method of producing a ceramic composite panel of the present invention comprising the steps of, positioning a pair of fiber reinforced ceramic matrix composite panels in spaced relationship; creating a foam from a pre-ceramic resin filling the space between the pair of panels; and, heating the resultant resin foam for a time and at a temperature which converts the pre-ceramic resin to a ceramic.

In its preferred implementation, the method additionally comprises the steps of, injecting a mixture of a liquid pre-ceramic resin and a liquid phenolic resin between the pair of panels; allowing the resultant mixture to chemically foam and set in the entire space between the panels to form a composite panel; and, heating the resultant composite panel for a time and at a temperature which converts the pre-ceramic resin to a ceramic and out-gasses the phenolic resin.

An alternate method of producing a ceramic composite panel according to the present invention comprises the steps of, saturating a first web of a generic fiber system with a liquid pre-ceramic resin; depositing a mixture of a liquid pre-ceramic resin and a liquid phenolic resin on the first web; allowing the resultant mixture to chemically foam and expand into a foam layer; saturating a second web of a generic fiber system with a liquid pre-ceramic resin; disposing the second web on the foam layer while compressing the foam layer to a desired thickness; and, heating the resultant composite panel for a time and at a temperature which converts the pre-ceramic resin to a ceramic and out-gasses the phenolic resin.

DETAILED DESCRIPTION OF THE PREFERRED EMBODIMENT

In a co-pending application by David Daws et al. entitled CERAMIC FOAM AND METHODS FOR PRODUCING SAME, filed on even date herewith as Ser. No. 08/515,928 and assigned to the common assignee of this application now U.S. Pat. No. 5,643,512, the teachings of which are incorporated herein by reference, a ceramic foam is disclosed which is the preferred core material for composite panels according to the present invention.

In a co-pending application by Steve Atmur and Tom Stresser entitled HIGH-EFFICIENCY, LOW-POLLUTION ENGINE, filed on Aug. 16, 1995 as Ser. No. 08/515,604 and assigned to the common assignee of this application now U.S. Pat. No. 5,638,779, the teachings of which are incorporated herein by reference, a fiber reinforced ceramic matrix composite (FRCMC) material is disclosed which is the preferred skin material for composite panels according to the present invention.

Figure 1:
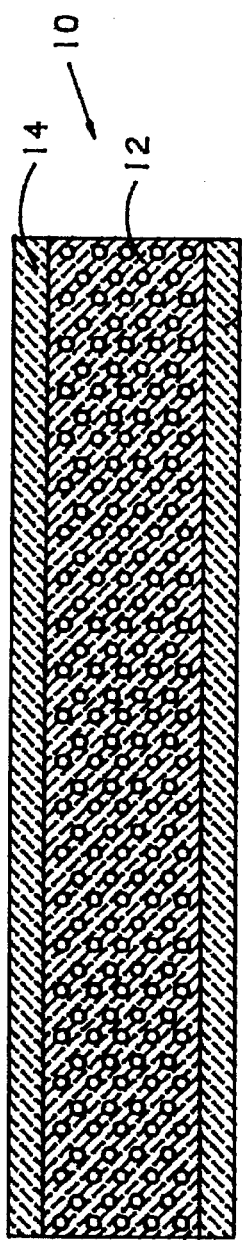
FIG. 1 is a simplified cross-section through a composite ceramic panel according to the present invention.

As depicted in FIG. 1, the preferred panel 10 of the present invention comprises the above-referenced ceramic foam 12 disposed between skins 14 of the above-referenced FRCMC material. Panels 10 according to the present invention can be produced in several ways which will be described in greater detail hereinafter. They can be made as "standard" flat building panels or can be custom made in various sizes and shapes.

Figure 2:
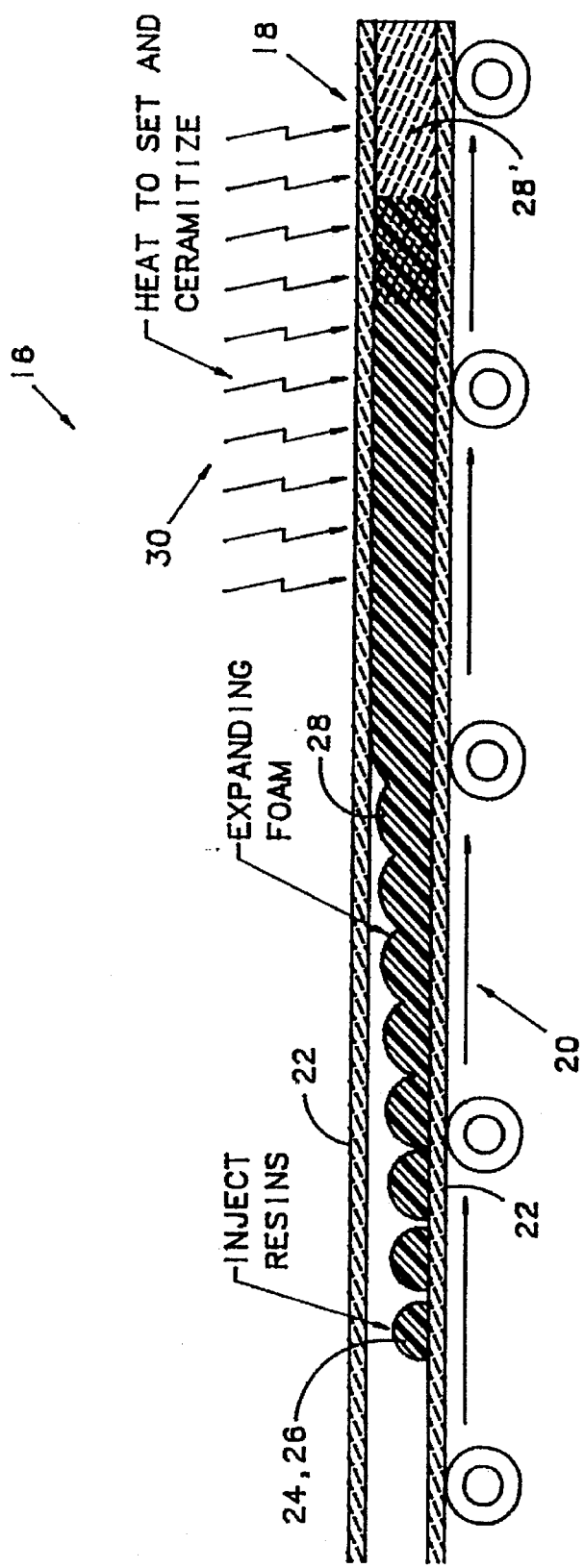
FIG. 2 is a simplified cross section through apparatus according to the present invention in a first embodiment for producing composite ceramic panels.

Using the assembly apparatus 16 of FIG. 2, flat panels 18 of a fixed width can be produced and cut to desired lengths.

The conveyor 20 moves two pre-formed skin panels 22 along in spaced relationship to one another. The two skin panels 22 are spaced from one another at the thickness of the resultant panels 18. As described in detail in the above-referenced co-pending application, the skin panels 22 comprise fibers of a generic fiber system disposed throughout a pre-ceramic resin which has then been pyrolized to change the resin to its ceramic state.

As depicted in FIG. 2, the ceramic foam forming the core of the composite panels of present invention is produced by mixing a liquid pre-ceramic resin 24 with a liquid phenolic resin 26 and injecting the mixture into the space between the two skin panels 22. The mixture then self-foams to form an open and/or closed cell foam 28 which is a combination of the pre-ceramic resin 24 and the phenolic resin 26. Once the foam 28 has formed and set up via a low temperature cure (130° F.), it is heated in an oven 30 where it is heated at a series of times and temperatures as specified by the manufacturer of the liquid pre-ceramic resin 24 for converting the resin 24 to a ceramic.

As stated in the above-referenced, co-pending application, the preferred pre-ceramic resin 24 is one sold under the tradename Blackglas 489D by Allied-Signal Corporation. It has a viscosity close to that of water and, therefore, combines with other resins easily. Similarly, any of several phenolic resins can be used, but those made by the Crest Company have been used in the tested embodiments and are, therefore, preferred.

The foam 28 prior to heating is a mixture of the two resins 24, 26 and contains open and closed cell pores (not shown). Non-ceramic components are out-gassed during the heating process which converts the pre-ceramic resin 24 to a ceramic foam 28'. In the process, the pores 18' are also enlarged and the skins 22 are fused and bonded to the surface of the foam 28' to form the panel 18.

During the heating process and a subsequent oxidation process, approximately 20% of the pre-ceramic resin 24 is lost and all of the phenolic resin 26 is lost. Thus, the ceramic foam 28' comprises approximately 70% of the original resin 24. A series of tests were run at various resin ratios to determine the qualities of the foam 28' at different ratios. The results of those tests appear in Table A. The trend appears to indicate that the best foaming occurs at a pre-ceramic resin 24 to phenolic resin 26 ratio or greater than 50/50. The best qualitative strength values are at a pre-ceramic resin 24 to phenolic resin 26 ratio of greater than 70/30. The best qualitative results from inspection of the samples indicates that the 90/10 pre-ceramic resin 24 to phenolic resin 26 ratio provided the best ceramic foam sample relative to catalytic converter and/or structural use. That sample was subjected to 1,000° F. and 1,800° F. air exposures to determine the resistance to high temperature oxidation. That data is listed in Table B. As can be seen from the table, the total weight loss(es) were not significant and structural integrity was maintained.

TABLE A

Ceramic Foam Test Results

| Sample | C-resin | P-resin | Foamed | Strength | Pre | Post | Yield (wt. %) |
|---|---|---|---|---|---|---|---|
| A | 24% | 90% | Well | Week | 19.90 | 8.47 | 42.6 |
| B | 20% | 80% | Massive | Weak | 20.24 | 9.28 | 46.2 |
| C | 30% | 70% | Mediocre | Solid | 19.93 | 24.46 | 52.5 |
| D | 40% | 60% | Mediocre | Strong | 20.11 | 11.42 | 56.8 |

TABLE A-continued

Ceramic Foam Test Results

| Sample | C-resin | P-resin | Foamed | Strength | Pre | Post | Yield (wt. %) |
|---|---|---|---|---|---|---|---|
| E | 50% | 50% | Mediocre | Strong | 20.11 | 26.37 | 61.5 |
| L | 50% | 50% | Well | Strong | 20.16 | 26.30 | 61.0 |
| F | 60% | 40% | Well | Strong | 20.00 | 13.63 | 68.2 |
| G | 70% | 30% | Well | Solid | 20.20 | 28.41 | 71.3 |
| H | 80% | 20% | Well | Strong | 20.08 | 15.27 | 76.0 |
| I | 90% | 24% | Well | Solid | 20.16 | 16.18 | 80.3 |

TABLE B

Sample I Air Heating Test Results

| Sample | Temp. | Duration | Pre-oxid(g) | Post-oxid(g) | Chg. Wt. % |
|---|---|---|---|---|---|
| I | 1,000° F. | 10 hrs | 16.9226 | 15.9631 | −5.66 |
| I | 1,800° F. | 10 hrs | 15.9997 | 15.7006 | −1.87 |

As can be appreciated, the ratio chosen will be a function of each application and the desired qualities of the resultant ceramic foam 28' and, therefore, the panels 18.

Example of Blackglas resin pyrolysis process:

Fabrication of a sealable container, such as a stainless steel box, capable of withstanding 1,700° F. is required for the pyrolysis cycle in a standard furnace. In the alternative, an inert gas furnace could be used if available. The box should have two tubing connections, one on the bottom and one on the top to allow the box to be flooded with an inert gas. In this example, the oven area 30 would be placed in the box, the box placed in a standard furnace, and stainless steel tubing connected to the lower connector on the box and to a supply of high purity argon. Any equivalent inert gas could, of course, be used. The argon is allowed to flow into the box, and out the top vent at a rate of 5–24 standard cubic feet per hour for the entire heat cycle, thus assuring the foam is totally enveloped in an inert environment. The furnace is closed and fired on the following basis:

A) Ramp to 300° F. at 223°/hour

B) Ramp to 900° F. at 43°/hour

C) Ramp to 1600° F. at 50°/hour

D) Hold at 1600° F. for 4 hours

E) Ramp to 77° F. at −265°/hour

There are a variety of heating schedules other than this one, given by way of example only, which will yield usable ceramic foam. When employed in apparatus 16 in which the components are continuously moving, the oven area 30 would have to be adapted to achieve the desired results of converting the resin 24 within the foam 28 to a ceramic in an inert environment.

A modification of the apparatus of FIG. 2 could also be employed to make shaped articles having composite ceramic panel walls. The two skins 22 could first be formed in a mold and then the foam 28 formed between them. Once set up, the article would then be moved to an oven for pyrolizing in the above-described manner to ceramitize the resin 24.

Figure 3:
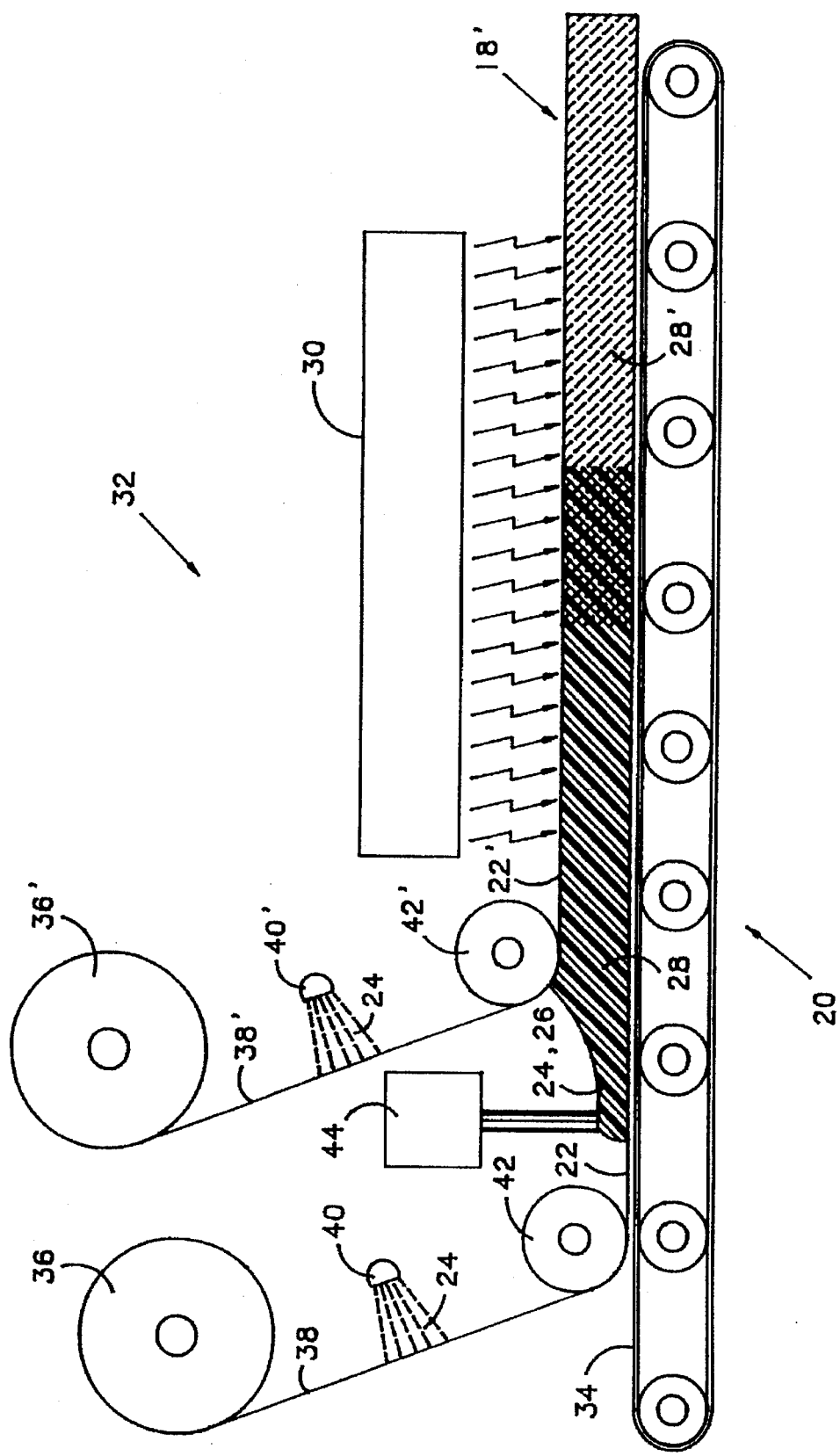
FIG. 3 is a simplified cross section through apparatus according to the present invention in a second embodiment for producing composite ceramic panels.

An alternate apparatus for forming flat or shaped panels is depicted in FIG. 3 where it is generally indicated as 32. As in the apparatus 16 of FIG. 2, there is a conveyor 20. If the panels 18' being produced are flat, the top surface 34 of the conveyor 20 is flat. If the panels 18' being produced are curved in cross section, the top surface 34 of the conveyor 20 is curved in cross section in the same amount. In the apparatus 32, the bottom skin 22 and top skin 22' are formed as part of the assembly process as compared with the apparatus 16 of FIG. 2 in which the two skins 22 were pre-formed of FRCMC material. There is a first supply roll 36 of a first matting web 38 of the generic fiber system being employed. The first web 38 passes by a first spray 40 of pre-ceramic resin 24 which saturates the first web 38 with the resin 24 before it is laid onto the top surface 34 of the conveyor 20 by a first roller 42. As with the top surface 34, if the panels 18' being produced are flat, the outer surface of the first roller 42 is flat. If the panels 18' being produced are curved in cross section, the outer surface of the first roller 42 is curved in cross section in the same amount.

At the station 44, the mixture of resins 24, 26 is deposited across the first web 38 where it begins to foam and expand. There is a second supply roll 36' of a second matting web 38' of the generic fiber system being employed. The second web 38' passes by a second spray 40' of pre-ceramic resin 24 which saturates the second web 38' with the resin 24 before it is laid onto the expanded foam 28 which is then compress to the desired panel thickness by a second roller 42'. Again, if the panels 18' being produced are flat, the outer surface of the second roller 42' is flat and if the panels 18' being produced are curved in cross section, the outer surface of the second roller 42' is curved in cross section in the same amount. The balance of the apparatus 32 is substantially identical to the apparatus 16 of FIG. 2. Once the foam 28 has formed and set up, it is heated in an oven 30 where it is heated at a series of times and temperatures as specified by the manufacturer of the liquid pre-ceramic resin 24 for converting the resin 24 to a ceramic.

As those of ordinary skill in the art will readily recognize and appreciate, there are numerous variations which can be made to the panels and the assembly apparatus of the present invention within the scope and spirit of the invention. For example, one might want to have the outer skins in parallel, spaced relationship to one another for a panel of constant thickness. In other applications, the foam core might be thicker in some areas than in others for added strength at those areas. This applies whether the panels are flat or curved in cross section. For example, a nose cone of a re-entry vehicle might need to be thicker at to leading area to withstand the higher temperatures developed at the point of contact with the atmosphere.

Wherefore, having thus described the present invention, what is claimed is:

1. Apparatus for producing a ceramic composite panel comprising:
   a) apparatus for positioning a pair of fiber reinforced ceramic matrix composite panels in spaced relationship;
   b) apparatus for injecting a mixture of a liquid pre-ceramic resin and a liquid phenolic resin between said pair of panels so that the resultant mixture chemically foams and sets in an entire space between said panels to form a composite panel; and,
   c) apparatus for heating said composite panel within an inert environment for a time and at a temperature which converts said pre-ceramic resin to a ceramic and out-gasses said phenolic resin.

2. Apparatus for producing a ceramic composite panel comprising:
   a) apparatus for positioning a pair of fiber reinforced ceramic matrix composite panels in spaced relationship;
   b) apparatus for creating a foam from a pre-ceramic resin filling the entirety of a space between said pair of panels; and,
   c) apparatus for heating said foam for a time and at a temperature which converts said pre-ceramic resin to a ceramic.

3. The apparatus of claim 2 and additionally comprising:
   a) apparatus for injecting a mixture of a liquid pre-ceramic resin and a liquid phenolic resin in a space between said pair of panels;
   b) means for allowing said mixture to chemically foam and set in the entirety of said space between the panels to form a composite panel; and,
   c) apparatus for heating said composite panel for a time and at a temperature which converts said pre-ceramic resin to a ceramic and out-gasses said phenolic resin.

4. Apparatus for producing a ceramic composite panel comprising:
   a) a supply of a first fibrous web;
   b) apparatus for saturating said first web with a liquid pre-ceramic resin;
   c) apparatus for depositing a mixture of a liquid pre-ceramic resin and a liquid phenolic resin on said first web;
   d) means for allowing the resultant mixture to chemically foam and expand into a foam layer;
   e) a supply of a second fibrous web of said generic fiber system;
   f) apparatus for saturating said second web with a liquid pre-ceramic resin;
   g) apparatus for depositing said second web on said foam layer while compressing said foam layer to a desired thickness to form a composite panel; and,
   h) apparatus for heating said composite panel within an inert environment for a time and at a temperature which converts said pre-ceramic resin to a ceramic and out-gasses said phenolic resin.

* * * * *